(12) United States Patent
Wang et al.

(10) Patent No.: US 10,742,361 B2
(45) Date of Patent: Aug. 11, 2020

(54) METHOD AND NETWORK NODE FOR MANAGING HARQ ATTEMPTS PARAMETER FOR D2D LINKS

(71) Applicant: Telefonaktiebolaget L M Ericsson (publ), Stockholm (SE)

(72) Inventors: Min Wang, Luleå (SE); Martin Winbjörk, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 949 days.

(21) Appl. No.: 14/889,456

(22) PCT Filed: Oct. 15, 2015

(86) PCT No.: PCT/EP2015/073849
§ 371 (c)(1),
(2) Date: Nov. 6, 2015

(87) PCT Pub. No.: WO2017/063697
PCT Pub. Date: Apr. 20, 2017

(65) Prior Publication Data
US 2017/0257192 A1  Sep. 7, 2017

(51) Int. Cl.
*H04L 1/18* (2006.01)
*H04L 1/08* (2006.01)
*H04W 76/14* (2018.01)

(52) U.S. Cl.
CPC .............. *H04L 1/1825* (2013.01); *H04L 1/08* (2013.01); *H04L 1/189* (2013.01); *H04L 1/1812* (2013.01); *H04W 76/14* (2018.02)

(58) Field of Classification Search
CPC ....... H04L 1/18; H04L 1/1812; H04L 1/1887; H04L 1/1822; H04L 1/1819; H04L 47/14;
(Continued)

(56) References Cited

U.S. PATENT DOCUMENTS 5,905,720 A * 5/1999 Lin ................... H04W 72/0446
370/337
7,647,040 B2 * 1/2010 Kim .................. H04M 1/72563
455/414.4
(Continued)

FOREIGN PATENT DOCUMENTS

WO  2010049801 A1  5/2010
WO  2014185836 A1  11/2014

OTHER PUBLICATIONS

Fujitsu, "Resource Allocation for Type 1 D2D Discovery", 3GPP TSG-RAN1 #76bis, Shenzhen, China, Mar. 31, 2014, pp. 1-3, R1-141510, 3GPP.
(Continued)

*Primary Examiner* — Min Jung
(74) *Attorney, Agent, or Firm* — Coats & Bennett, PLLC (57) ABSTRACT

A network node (110), a first device (111) and methods therein for managing a HARQ parameter indicating a number of autonomous HARQ transmission attempts to be applied for a transmission on at least one D2D link between the first device (111) and the second device (112) are disclosed. The method comprises determining (A010) a load relating to D2D communication between at least the first and second devices (111, 112). Next, the HARQ parameter is determined (A020) based on the load. Corresponding computer programs and carriers therefor are also disclosed.

16 Claims, 4 Drawing Sheets

(58) Field of Classification Search
CPC ......... H04L 47/10; H04L 1/1825; H04L 1/08; H04L 1/189; H04W 92/18; H04W 4/005; H04W 72/12; H04W 52/48; H04W 72/0486; H04W 8/005; H04W 76/14

See application file for complete search history.

(56) References Cited

U.S. PATENT DOCUMENTS

| | | | | |
|---|---|---|---|---|
| 7,697,469 | B2* | 4/2010 | Wu | H04L 1/0009 370/328 |
| 8,181,080 | B2* | 5/2012 | Jugl | H04L 1/1825 714/749 |
| 8,284,754 | B2* | 10/2012 | Chang | H04L 1/1607 370/350 |
| 8,761,099 | B2* | 6/2014 | Charbit | H04W 72/04 370/329 |
| 8,902,918 | B2* | 12/2014 | Huang | H04L 1/0015 370/437 |
| 9,515,800 | B2* | 12/2016 | Lim | H04L 1/1854 |
| 10,044,474 | B1* | 8/2018 | Oroskar | H04L 1/1812 |
| 2003/0133408 | A1* | 7/2003 | Cheng | H04L 12/66 370/230 |
| 2007/0300120 | A1* | 12/2007 | Kim | H04L 1/1851 714/749 |
| 2011/0004797 | A1 | 1/2011 | Gerstenberger et al. | |
| 2011/0243010 | A1 | 10/2011 | Geirhofer et al. | |
| 2012/0093098 | A1 | 4/2012 | Charbit et al. | |
| 2013/0157676 | A1 | 6/2013 | Baek et al. | |
| 2014/0286295 | A1* | 9/2014 | Liu | H04W 72/10 370/329 |
| 2015/0110027 | A1* | 4/2015 | Lim | H04L 1/1812 370/329 |
| 2015/0180616 | A1* | 6/2015 | Lee | H04L 1/1812 370/329 |
| 2015/0312371 | A1* | 10/2015 | Han | H04W 4/70 370/281 |
| 2015/0319746 | A1* | 11/2015 | Lu | H04W 72/042 370/280 |
| 2017/0188375 | A1* | 6/2017 | Seo | H04W 72/02 |
| 2017/0207885 | A1* | 7/2017 | Lee | H04L 5/00 |
| 2018/0212746 | A1* | 7/2018 | Kazmi | H04L 1/1812 |

OTHER PUBLICATIONS

NEC, "On resource selection for Type 1 discovery message transmission", 3GPP TSG RAN WG1 Meeting #77, Seoul, Korea, May 19, 2014, pp. 1-4, R1-142172, 3GPP.

Intel, "WF on Repeated Transmissions of Discovery Message within a Discovery Period", 3GPP TSG RAN WG1 #78bis, Ljubljana, Slovenia, Oct. 6, 2014, pp. 1-6, R1-144401, 3GPP.

Ericsson, "Remaining details of Discovery Resource Allocation", 3GPP TSG-RAN WG1 Meeting #79, San Francisco, USA, Nov. 17, 2014-11-17, pp. 1-2, R1-145150, 3GPP.

3RD Generation Partnership Project, "3rd Generation Partnership Project; Technical Specification Group Radio Access Network; Study on LTE Device to Device Proximity Services; Radio Aspects (Release 12)", Technical Report, 3GPP TR 36.843 V12.0.1, Mar. 1, 2014, pp. 1-50, 3GPP, France.

3RD Generation Partnership Project, "3rd Generation Partnership Project; Technical Specification Group Radio Access Network; Evolved Universal Terrestrial Radio Access (E-UTRA); Medium Access Control (MAC) protocol specification (Release 12)", Technical Specification, 3GPP TS 36.321 V12.6.0, Jun. 1, 2015, pp. 1-77, 3GPP, France.

* cited by examiner

METHOD AND NETWORK NODE FOR MANAGING HARQ ATTEMPTS PARAMETER FOR D2D LINKS

TECHNICAL FIELD

Embodiments herein relate to wireless communication systems, such as mixed cellular and Device-To-Device (D2D) systems. In particular, a method and a network node for managing a Hybrid Automatic Repeat reQuest (HARQ) parameter indicating a number of autonomous HARQ transmission attempts to be applied for a transmission on at least one D2D link are disclosed. Corresponding computer programs and carriers therefor are also disclosed.

BACKGROUND

A mixed cellular and D2D system allows devices to directly exchange information with each other, i.e. without passing through a base station and a core network as is common with conventional cellular communication systems. An exemplifying mixed cellular and D2D system, e.g. featuring D2D Proximity Services (D2D ProSe), was introduced with Release-12 (Rel-12) of Long Term Evolution (LTE) of the Third Generation Partnership Project (3GPP). With D2D ProSe, two main services for D2D communication are provided; a direct communication service and a direct discovery service.

With the direct communication service, the devices establish a direct user plane connection. The direct communication service primarily includes voice, such as Voice over Internet Protocol (VoIP), and file transfer, such as file transfer over File Transfer Protocol (FTP). With the direct discovery service, the devices transmit and monitor signals that enable them to be aware of proximity to another device or other devices.

Use cases for D2D ProSe include both Public Safety (PS) and commercial use.

In the PS applications, the direct communication service provides basic VoIP connectivity to other devices, independently of cellular coverage, such as LTE coverage, for the devices. Moreover, the direct discovery service may provide functions for detection of presence of peer devices, e.g. based on their professions or the like. Typically, in an emergency situation, it would be beneficial to easily find out if there is any doctor and/or nurse nearby.

In the commercial applications, the direct communication service provides simple push-to-talk functions, where communication typically is be one-to-many. Furthermore, the direct discovery service can broadcast advertisements, such as "pizza for 5$", etc.

In a known mixed cellular and D2D system according to 3GPP Rel-12, a discovery message is sent from a device in order to enable other devices to find it and set up one or more D2D links. The discovery message is configurable with up to 3 HARQ retransmissions of the original discovery message. This means that the original discovery message can be repeated three times. Moreover, the HARQ retransmissions are autonomous, which means that the HARQ retransmissions are sent without reception of any HARQ feedback. The configuration of a number of HARQ retransmissions is cell specific, which means that all devices served by the same cell, or base station, will have the same number of HARQ retransmission attempts. On a per cell basis, it is thus possible to adjust the number of HARQ retransmissions. A disadvantage is though that it may be difficult to adjust the number of HARQ retransmissions for D2D links such that improved D2D communication may be achieved.

SUMMARY

An object may be to improve performance of the above mentioned mixed cellular and D2D system.

According to an aspect, the object is achieved by a method for managing a HARQ parameter indicating a number of autonomous HARQ transmission attempts to be applied for a transmission on at least one D2D link between a first device and a second device. The method comprises determining a load relating to D2D communication between at least the first and second devices. Next, the HARQ parameter is determined based on the load.

According to another aspect, the object is achieved by a network node configured for managing a HARQ parameter indicating a number of autonomous HARQ transmission attempts to be applied for a transmission on at least one D2D link between a first device and a second device. The network node is configured for determining a load relating to D2D communication between at least the first and second devices. Moreover, the network node is configured for determining the HARQ parameter based on the load. Furthermore, the network node is configured for sending, to at least the first device, the HARQ parameter.

According to a further aspect, the object is achieved by a first device configured for managing a HARQ parameter indicating a number of autonomous HARQ transmission attempts to be applied for a transmission on at least one D2D link between the first device and a second device. The first device is configured for determining a load relating to D2D communication between at least the first and second devices. Moreover, the first device is configured for determining the HARQ parameter based on the load.

According to further aspects, the object is achieved by a computer program and a carrier therefor corresponding to the aspects above.

Thanks to that the network node determines the HARQ parameter based on the load, the network node may set the HARQ parameter differently depending on the load.

For example, the network node may increase the HARQ parameter, i.e. increasing a number of HARQ attempts, when the load is low, in order to improve transmission efficiency.

However, as another example, the network node may decrease the HARQ parameter, when the load is high, in order to improve transmission efficiency. High and low may be determined in relation to a high threshold value and a low threshold value, respectively. In the latter example, the transmission efficiency is improved due to that transmission power of in-band emission is reduced, since fewer HARQ retransmissions will be applied. That is to say, for subframes no longer used for HARQ retransmission, the contribution to transmission power in-band is eliminated.

As a result, less interference, e.g. on average over some set of subframes, towards neighboring devices is generated.

Moreover, an advantage is that power consumption of the first device may be reduced, when the HARQ parameter is decreased. Hence, a so called battery-life of a battery of the first device may be extended.

Furthermore, an advantage is that dropping of services, such as calls, may be reduced, when the HARQ parameter is increased.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Throughout the following description similar reference numerals have been used to denote similar features, such as nodes, actions, steps, modules, circuits, parts, items elements, units or the like, when applicable. In the Figures, features that appear in some embodiments are indicated by dashed lines.

Figure 1:
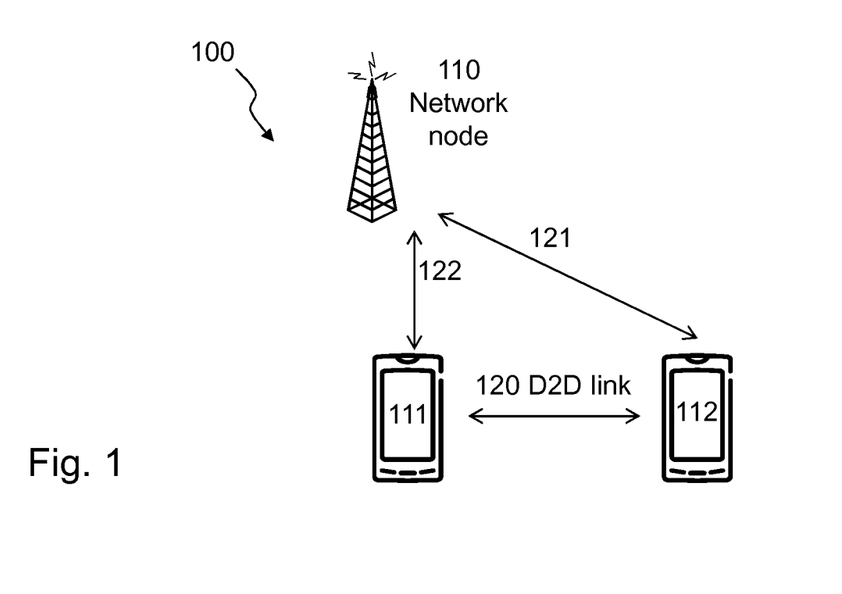
FIG. 1 is a schematic overview of an exemplifying system in which embodiments herein may be implemented.

FIG. 1 depicts an exemplifying mixed cellular and D2D system 100 in which embodiments herein may be implemented. In this example, the system 100 is a LTE system, e.g. Rel-12 or higher. In this context, a higher release is subsequent in time to Rel-12.

In other examples, the mixed cellular and D2D system 100 may be any cellular or wireless communication system, such as a Universal Mobile Telecommunication System (UMTS), Global System for Mobile communication (GSM) and Worldwide Interoperability for Microwave Access (Wi-MAX) allowing a layer of D2D communications or the like.

The mixed cellular and D2D system 100 comprises a network node 110, such as a radio network node, an evolved-Node B (eNB), a base station, a relay, a repeater, a radio remote unit a Base Station System (BSS), a Radio Network Controller (RNC), a Radio Base Station (RBS), a control node controlling one or more Remote Radio Units (RRUs), an access point and the like.

FIG. 1 further illustrates a first device 111 and a second device 112. In some examples, the first and second devices 111, 112 are within coverages of the network node 110. This means that the first and second devices 111 are present in the mixed cellular D2D system 100. In other examples, the first and/or second devices 111, 112 are Out-Of-Coverage (OOC) with respect to the network node 110.

The first and second devices 111, 112 may communicate 120 with each other. This communication, sometimes referred to as Sidelink, may include user transmissions and/or control transmissions. The user transmissions may include user data, payload data, content data etc. The control transmissions may include control information relating to e.g. scheduling, authentication, mobility, transmission parameters, HARQ retransmission parameter etc. In a typical scenario, the first device 111 sends user transmission to the second device 112. The second device 112 may then send control transmission to the first device 111.

As used herein, the term "device" may refer to a wireless communication device, a user equipment, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

The network node 110 may communicate 121, 122 with the first and second devices 111, 112. This communication may include user transmissions and/or control transmissions. The user transmissions may include user data, payload data, content data etc. The control transmissions may include control information relating to e.g. scheduling, authentication, mobility etc. The user transmissions are only relevant in case the first device is in a cellular mode. The communication may include uplink transmission and/or downlink transmission. A transmission may be referred to as a data block.

In order to better appreciate the benefits and advantages of the embodiments herein, the following observations are made.

Figure 2:
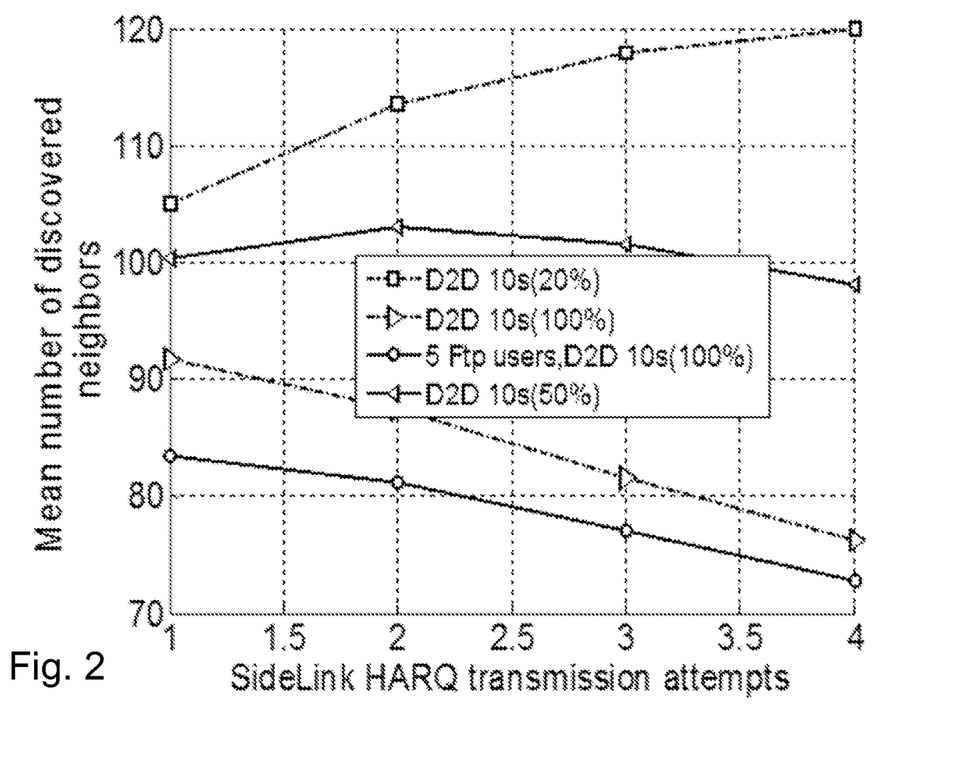
FIG. 2 is a diagram illustrating discovered neighbors as a function of HARQ retransmission attempts.
Figure 3:
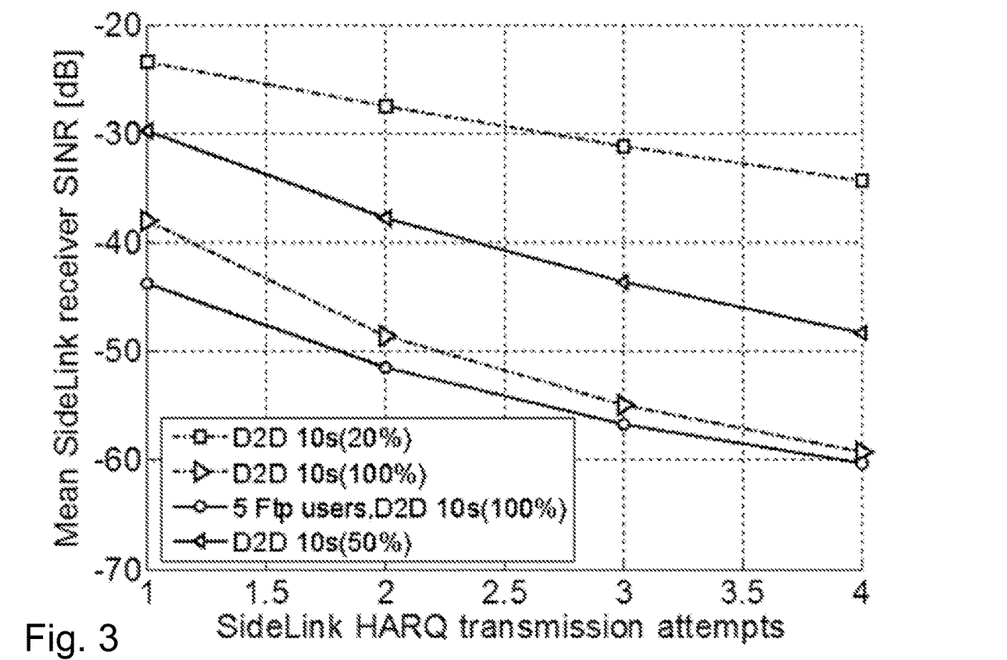
FIG. 3 is a diagram illustrating Signal-To-Interference-and-Noise Ratio (SINR) as a function of HARQ retransmission attempts.
Figure 4:
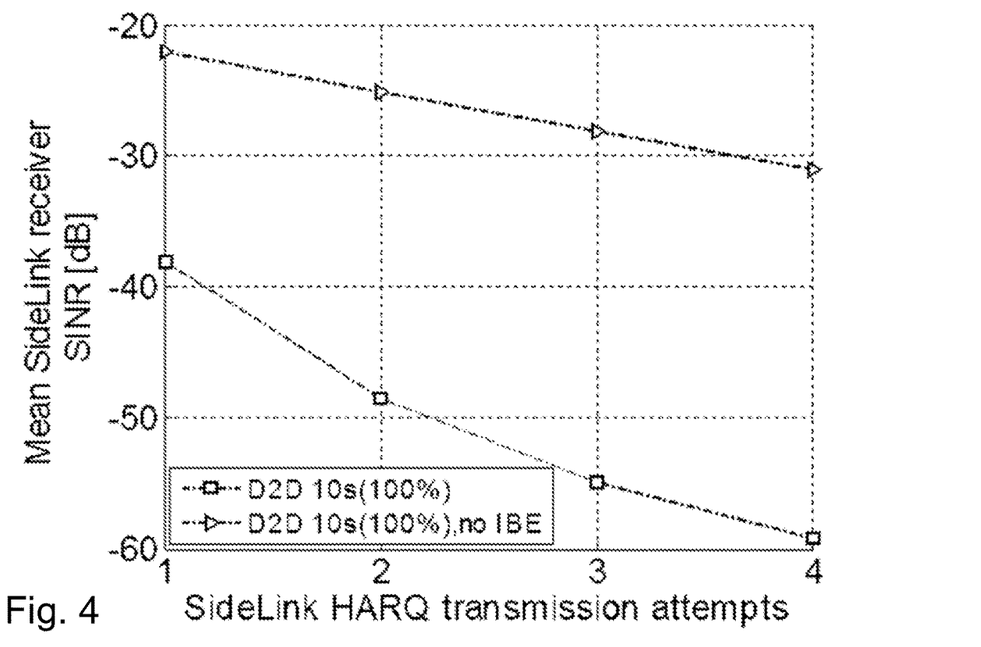
FIG. 4 is another diagram illustrating SINR as a function of HARQ retransmission attempts.

FIG. 2 illustrates a result of a study targeted to analyze D2D performance with respect to number of HARQ retransmissions as defined in 3GPP Rel-12. In FIGS. 2, 3 and 4, simulations with 75 D2D capable UEs per cell and 5 FTP UEs having uploading and downloading traffic per cell are illustrated.

In FIG. 2, mean number of discovered neighbors is plotted as a function of number of HARQ retransmission attempts for four different scenarios.

In a first scenario "D2D, 10 s (20%)", only 20% of the 75 D2D capable UEs are involved in D2D communication with some other of the 75 D2D capable UEs. In this scenario, D2D load may be said to be low.

In a second scenario "D2D, 10 s (50%)", 50% of the 75 D2D capable UEs are involved in D2D communication. In this scenario, D2D load may be said to be medium.

In a third scenario "D2D, 10 s (100%)", 100% of the 75 D2D capable UEs are involved in D2D communication. In this scenario, D2D load may be said to be high.

In a fourth scenario "5 FTP users, D2D, 10 s (100%)", 100% of the 75 D2D capable UEs are involved in D2D communication and 5 UEs are involved in cellular communication due to FTP uploading and downloading. In this scenario, D2D load may of course be said to be high as well.

From FIG. 2, it can be seen that in the first scenario, with low D2D load, better D2D discovery performance is observed as compared to the other scenarios. Here better D2D discovery performance means that a greater mean number of discovered neighbors are observed, i.e. more neighbors can successfully receive the discovery message. As the number of HARQ retransmission attempts increases, the mean number of discovered neighbors increases. In contrast thereto, as an extreme among these scenarios, it can been seen that, for the fourth scenario with high D2D load, worse D2D discovery performance is observed as compared to the other scenarios. Moreover, as the number of HARQ retransmission attempts increases, the mean number of discovered neighbors decreases. In the fourth scenario, more frequent HARQ transmissions cannot improve the performance due to higher interference. The interference is mainly caused by the power in-band emission from neighboring devices.

FIG. 3 illustrates Signal-To-Interference-and-Noise Ratio (SINR) as a function of HARQ retransmission attempts for the four scenarios described above in connection with FIG. 2. From FIG. 3, it can be seen that decrease in SINR is mainly dependent on D2D load, i.e. portion of D2D devices that are involved in D2D communication. A reason to this is that a first difference in SINR for the third and fourth scenarios is much less than a second difference in SINR for the second and third scenarios, or a third difference in SINR for the first and second scenarios.

Moreover, now turning to FIG. 4, SINR as a function of number of HARQ retransmission attempts is illustrated. In this Figure, two scenarios with and without consideration of power In-Band Emission (IBE) are illustrated. In this context, power IBE refers to interference, experienced by the second device 112, from neighboring devices transmitting on other resources, e.g. resource blocks, than the first device 111. From the Figure, it is observed that power in-band emission from neighboring devices results in a high drop of the SINR.

Figure 5:
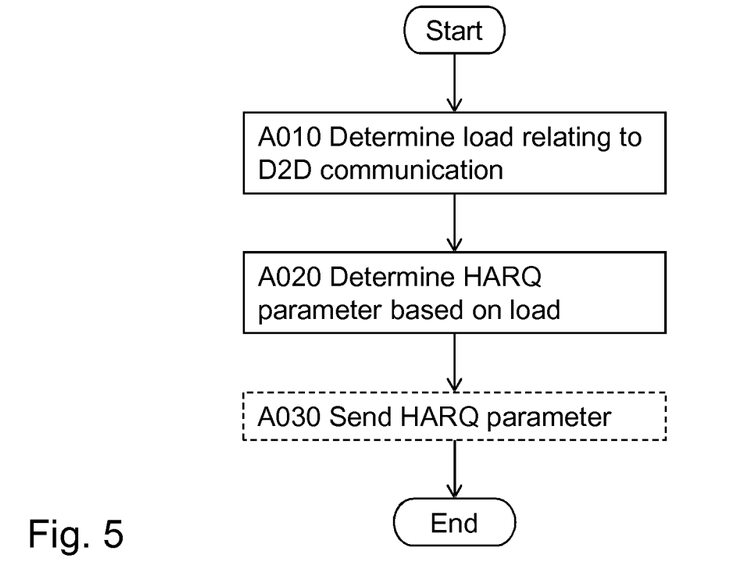
FIG. 5 is a flowchart illustrating embodiments of the method.

FIG. 5 illustrates an exemplifying method according to embodiments herein when implemented in the system 100 of FIG. 1. As an example, the network node 110 performs a method for managing a HARQ parameter indicating a number of autonomous HARQ transmission attempts to be applied for a transmission on at least one D2D link between the first device 111 and the second device 112. Said at least one D2D link may typically carry user transmissions from the first device 111 to the second device 112.

In other examples the method may be performed by the second device 112. In these examples, said at least one D2D link may carry control transmissions from the second device 112 to the first device 111. In yet further examples, the method may be performed by the first device 111. In these examples, the first device 111 autonomously determines the HARQ parameter to be applied for the transmissions to the second device 112.

For simplicity, the method is described in the following with reference to when the network node 110 performs the method.

One or more of the following actions may be performed in any suitable order.

Action A010

The network node 110 determines a load relating to D2D communication between at least the first and second devices 111, 112. In this manner, the network node 110 obtains the load to be used in action A020 below.

In case of an OOC scenario, it may be that the at least one D2D link is only a particular D2D link between the first and second devices 111, 112. This means that the second device 112 may determine the load based on only the particular D2D link.

However, when the network node 110 performs action A010, the at least one D2D link may be a plurality of D2D links, or even all D2D links managed by the network node 110. This means that the network node 110 may determine the load while taking a plurality D2D links into account.

The load may be determined as exemplified in section "Determining load".

Action A020

Subsequently to action A010, the network node 110 determines the HARQ parameter based on the load.

In some embodiments, the network node 110 may determine the HARQ parameter as a step function of load. Expressed differently, the determining A020 of the HARQ parameter comprises determining the HARQ parameter as a step function of load. The step function steps down for at least one specific increase of the load. Accordingly, the step function steps up for at least one specific decrease of the load.

Figure 6:
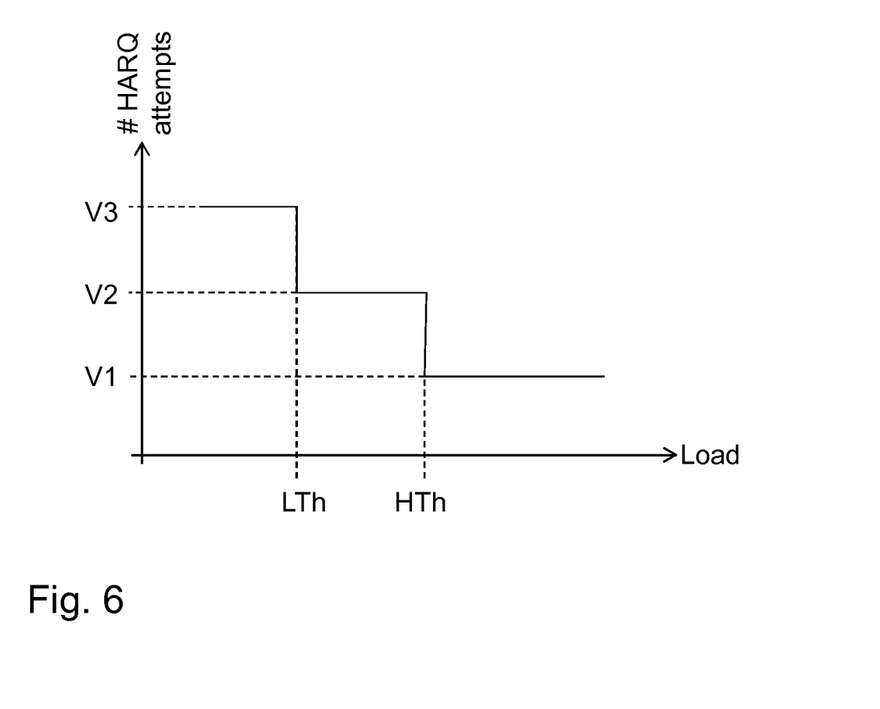
FIG. 6 is a schematic diagram illustrating an exemplifying step function.

As an example referring to FIG. 6, the HARQ parameter may have three pre-set levels, such as a first, a second and a third HARQ parameter value V1, V2, V3 indicating a respective number of HARQ attempts (# HARQ attempts). Exemplifying values of the first, second and third HARQ parameters may be 0, 1 and 3. Additionally, there may be two threshold values, such as a high threshold HTh and a low threshold LTh for the load relating to the D2D communication. The network node 110 may then set the HARQ parameter to the first HARQ parameter value when the load is greater than the high threshold. Should the load be less than the low threshold, the network node 110 may set the HARQ parameter to the third HARQ parameter value. In other cases, when the load is between the low and high threshold, the network node 110 may set the HARQ parameter to the second HARQ parameter value. In some examples as explained below, the number of HARQ attempts may first—for low load values—increase with load and then—for high load vales—decrease with load.

Thus, in other examples, the HARQ parameter may be determined, by the network node 110, as an at least partially inverse function of load, where the result of the function is rounded, ceiled or floored to the nearest integer value, e.g. within a range from 0 to 3 as given by the available configurations for HARQ retransmission attempts. Rounded, ceiled and floored shall be understood as mathematical functions as commonly used in the field of mathematics. As an example, the function may be:

$$f(\text{load})=a+k(b-\text{load}^2),$$

where a, b and k are constants that be empirically or theoretically determined. A resulting value of the function f is then rounded, ceiled or floored as explained above.

Action A030

The network node 110 may sends to at least the first device 111, the HARQ parameter. In this manner, said at least the first device 111 may be informed about which configuration to use, or apply, as number of HARQ attempts. This means that in subsequent subframes, the first device 11 will begin to send HARQ retransmissions according to the received, at the first device 111, HARQ parameter.

An advantage is hence that so called power In-Band Emission (IBE) may be reduced, in the subsequent subframes, when the HARQ parameter is applied by the first device.

In Action A030, the network node 110 may signal to at least one of the first and second devices 111, 112 the determined HARQ parameter. There are two ways to send the HARQ parameter to the first and second devices 111, 112: either by System Information Block (SIB) signalling or by dedicated signalling.

The SIB signalling, on the one hand, is suitable if the HARQ parameter is applicable to all devices, such as the first and second devices 111, 112, served by the same cell, e.g. the network node 110.

The dedicated signalling, on the other hand, may provide additional flexibility if the determined HARQ parameter is applicable only to specific devices, such as the first or second device 111, 112.

Both SIB signalling and dedicated signalling may be applied in combination in some examples.

When the second device 112 is out-of-coverage, the HARQ parameter may be received on the Physical Sidelink Broadcast Channel (PSBCH), which is broadcasted by the first device 111 still within coverage.

As an exemplifying further signalling alternative, the network node 110 may pre-configure multiple configurations, i.e. pre-configured HARQ parameters, which are applicable to different load scenarios. The different load scenarios may be identified by the low and/or high thresholds described above. The first and second devices 111, 112 may then obtain the pre-configured HARQ parameters at an occasion, such as during initial attach to the system 100, or at some other time. In this example, the network node 110 does not need to send the HARQ parameter when the load varies. Instead, it will be up to the device, e.g. the first device 110, to choose an appropriate HARQ parameter among the pre-configured HARQ parameters by itself.

The devices, neighbouring to the first device 111, may become aware of the HARQ parameter currently applied in various manners.

The first device 111 may send the HARQ parameter configuration to the neighbouring devices via a D2D control channel, such as Physical Sidelink Control Channel (PSCCH). Alternatively, or even additionally, the first device 111 may include the HARQ parameter in a Medium Access Control (MAC) element of a MAC Packet Data Unit (PDU).

The MAC element may be configured as shown below:

| Group Index | LCG ID | Configuration ID |
|---|---|---|

Group index: The group index field identifies the ProSe (Proximity based Services) Destination. The group is typically composed of devices, such as the first and second devices 111, 112, in the vicinity of each other, with the support of the ProSe functionality.

LCG ID: The Logical Channel Group (LCG) ID field identifies the group of logical channel(s) which buffer status is being reported.

Configuration ID identifies which configuration to apply according to the signalling.

The second device 112 may be informed about the HARQ parameter in advance of the transmission thanks to that the first device 111 may perform the following actions:
1. The first device 111 may transmit, to the second device 112, the HARQ parameter to be used in subsequent transmissions. The HARQ parameter may then be included in the MAC element in a separate MAC PDU packet.
2. Next, the first device 111 may transmit data packets while applying the received, from the network node 110 as in action A030, HARQ parameter.

Step 1 may preferably only be executed once during a given period since the HARQ parameter should be static for during the given period. Step 2 is executed in a sub-frame that is different from the sub-frame in which step 1 is executed. Hence, the second device 112 may receive the HARQ parameter and a user data transmission in sequential sub-frames.

Determining Load

Now elaborating on how the load may be determined. The network node 110, or the second device 112, may determine the load based on at least one of:
- a number of physical resource blocks used for the D2D communication,
- a number of sub-frames occupied by the D2D communication,
- a number of devices involved in the D2D communication,
- statistics concerning decoding of D2D physical channels of the D2D communication,
- received power per packet of the D2D communication,
- a delay of D2D discovery,
- a delay of D2D transmissions in the D2D communication,
- a percentage of neighboring devices, being neighbors to at least one of the first device 111 and the second device 112, which neighboring devices are capable of successfully receiving one D2D packet within one transmission period, and
- the like.

The number of physical resources blocks may indicate the load, since when a great number of physical resource blocks are used for D2D communication a lot of information may be transferred over the D2D link.

The number of sub-frames occupied by the D2D communication may indicate the load, since when a great number of sub-frames are used for D2D communication a lot of information may be transferred over the D2D link.

The number of devices involved in the D2D communication may indicate the load, since for an average transmission activity among the number of devices, the load will increase for an increased number of devices involved in the D2D communication.

The statistics concerning decoding of D2D physical channels of the D2D communication may indicate the load, since when decoding is not successful, it may be a sign of that interference towards said at least one D2D link is too high. As described above in relation to FIG. 3 and/or FIG. 4, such unsuccessful decoding will primarily be dependent on amount of D2D device involved in the D2D communication. Hence, when the load is high, the decoding statistics will indicate many unsuccessful decodings.

The delay of D2D discovery may indicate the load, since if the delay is high, the load is expected to be high due to that many retransmission attempts of the discovery signaling is required. Many retransmission attempts do, in turn, cause a high delay.

The received power per packet of the D2D communication may indicate the load according to similar reasoning as above.

The delay of D2D transmissions in the D2D communication may indicate the load according to similar reasoning as above.

The percentage of devices, being neighbors to the first device 111, which devices are capable of successfully receiving one D2D packet within one transmission period may indicate the load according to similar reasoning as above.

The metrics above indicate how good the D2D performance is. So, the better performance might indicate the system load is low, while worse performance might indicate that the system load is higher. The above metrics may be combined to provide a better evaluation of the system load. A single metric might not provide as accurate results.

In a further example, an amount of resources used for D2D communication is adjusted based on the load relating to D2D transmission. Hence, when the load is high a greater number of resources is assigned, or reserved, for D2D transmission as compared to when the load is low. Again, "high" and/or "low" may be related to the respective one of the high and low threshold value mentioned above. The resources may refer to number of subframes, physical resource blocks, channels, D2D transmission periodicity or the like, which may be reserved for D2D communication. The D2D transmission periodicity may indicate a so called discovery period.

In a particular embodiment, the method above is performed by the first device 111. In this embodiment, action A030 is not performed. Instead, the first device 111 applies the HARQ parameter in subsequent subframes. This means that the first device 111 will begin to send HARQ retransmissions according to the determined HARQ parameter.

With reference to FIG. 6, a schematic block diagram of embodiments of the network node 110 of FIG. 1 is shown.

Figure 7:
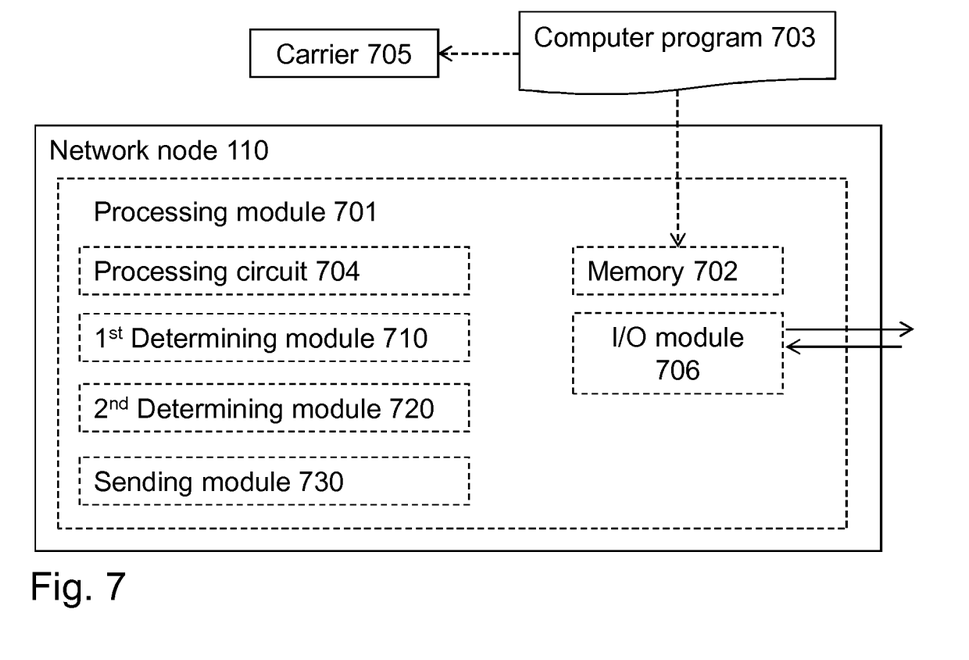
FIG. 7 is a block diagram illustrating embodiments of the network node.

The network node 110 may comprise a processing module 601, such as a means, one or more hardware modules and/or one or more software modules for performing the methods described herein.

The network node 110 may further comprise a memory 602. The memory may comprise, such as contain or store, a computer program 603.

According to some embodiments herein, the processing module 601 comprises, e.g. 'is embodied in the form of' or 'realized by', a processing circuit 604 as an exemplifying hardware module. In these embodiments, the memory 602 may comprise the computer program 603, comprising computer readable code units executable by the processing circuit 604, whereby the network node 110 is operative to perform the methods of FIG. 5.

In some other embodiments, the computer readable code units may cause the network node 110 to perform the method according to FIG. 5 when the computer readable code units are executed by the network node 110.

FIG. 7 further illustrates a carrier 705, or program carrier, which comprises the computer program 703 as described directly above.

In some embodiments, the processing module 701 comprises an Input/Output module 706, which may be exemplified by a receiving module and/or a sending module as described below when applicable.

In further embodiments, the processing module 701 may comprise one or more of a first determining module 710, a second determining module 720, and a sending module 730 as exemplifying hardware modules. In other examples, one or more of the aforementioned exemplifying hardware modules may be implemented as one or more software modules.

Accordingly, the network node 110 is configured for managing a HARQ parameter indicating a number of autonomous HARQ transmission attempts to be applied for a transmission on at least one D2D link between the first device 111 and the second device 112. It shall be understood that the network node 110 may be the second device 112 in some examples.

Therefore, according to the various embodiments described above, the network node 110 and/or the processing module 701 and/or the first determining module 710 is configured for determining a load relating to D2D communication between at least the first and second devices 111, 112.

Moreover, the network node 110 and/or the processing module 701 and/or the second determining module 720 is configured for determining the HARQ parameter based on the load.

Furthermore, the network node 110 and/or the processing module 701 and/or the sending module 730 is configured for sending, to at least the first device 111, the HARQ parameter.

In some embodiments, the network node 110 and/or the processing module 701 and/or the second determining module 720, or a further determining module (not shown) may be configured for determining the HARQ parameter by determining the HARQ parameter as a step function of load, wherein the step function steps down for at least one specific increase of the load.

The network node 110 and/or the processing module 701 and/or the first determining module 710, or a yet further determining module (not shown), may be configured for determining the load based on at least one of:

a number of physical resource blocks used for the D2D communication, a number of sub-frames occupied by the D2D communication, a number of devices involved in the D2D communication, statistics concerning decoding of D2D physical channels of the D2D communication, received power per packet of the D2D communication, a delay of D2D discovery, a delay of D2D transmissions in the D2D communication, a percentage of neighboring devices, being neighbors to at least one of the first device 111 and the second device 112, which neighboring devices are capable of successfully receiving one D2D packet within one transmission period, and the like.

Figure 8:
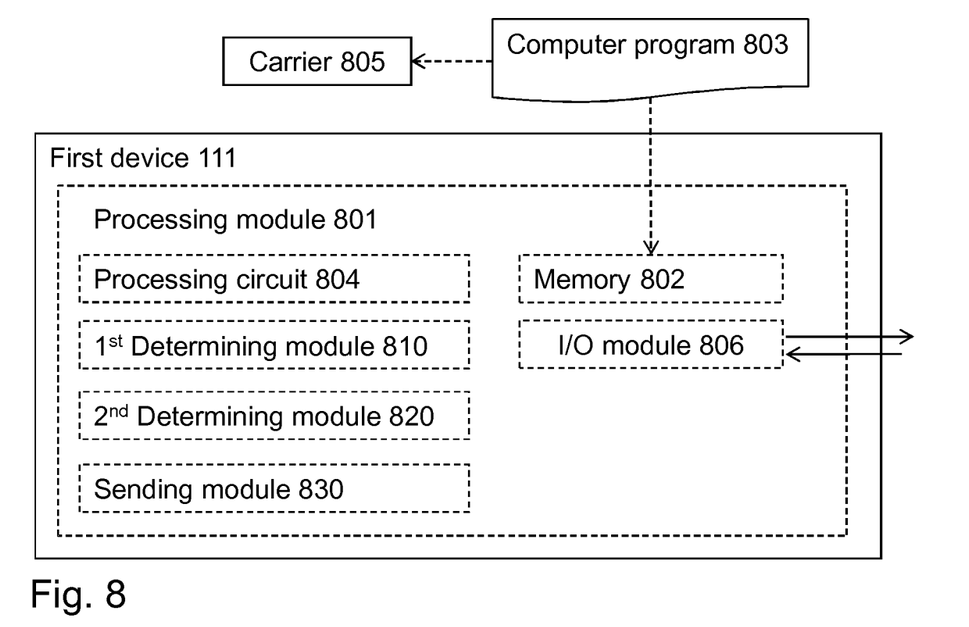
FIG. 8 is a block diagram illustrating embodiments of the first device.

With reference to FIG. 8, a schematic block diagram of embodiments of the first device 111 of FIG. 1 is shown.

The first device 111 may comprise a processing module 801, such as a means, one or more hardware modules and/or one or more software modules for performing the methods described herein.

The first device 111 may further comprise a memory 802. The memory may comprise, such as contain or store, a computer program 803.

According to some embodiments herein, the processing module 801 comprises, e.g. 'is embodied in the form of' or 'realized by', a processing circuit 804 as an exemplifying hardware module. In these embodiments, the memory 802 may comprise the computer program 803, comprising computer readable code units executable by the processing circuit 804, whereby the first device 111 is operative to perform the methods of FIG. 5.

In some other embodiments, the computer readable code units may cause the first device 111 to perform the method according to FIG. 5 when the computer readable code units are executed by the first device 111.

FIG. 8 further illustrates a carrier 805, or program carrier, which comprises the computer program 803 as described directly above.

In some embodiments, the processing module 801 comprises an Input/Output module 806, which may be exemplified by a receiving module and/or a sending module as described below when applicable.

In further embodiments, the processing module 801 may comprise one or more of a first determining module 810, a second determining module 820, and a sending module 830 as exemplifying hardware modules. In other examples, one or more of the aforementioned exemplifying hardware modules may be implemented as one or more software modules.

Accordingly, the first device 111 is configured for managing a HARQ parameter indicating a number of autonomous HARQ transmission attempts to be applied for a transmission on at least one D2D link between the first device 111 and the second device 112. It shall be understood that the first device 111 may send the transmission in some embodiments, but in some other embodiments the first device 111 may receive the transmission.

Therefore, according to the various embodiments described above, the first device 111 and/or the processing module 801 and/or the first determining module 810 is/are configured for determining a load relating to D2D communication between at least the first and second devices 111, 112.

Moreover, the first device 111 and/or the processing module 801 and/or the second determining module 820 is/are configured for determining the HARQ parameter based on the load.

In some embodiments, when the first device 111 receives the transmission on said at least one D2D link, the first device 111 and/or the processing module 801 and/or the sending module 830 is/are configured for sending, to the second device 112, the HARQ parameter.

In some embodiments, the first device 111 and/or the processing module 801 and/or the second determining module 820 is/are configured for determining the HARQ parameter by determining the HARQ parameter as a step function of load, wherein the step function steps down for at least one specific increase of the load.

The first device 111 and/or the processing module 801 and/or the first determining module 810 is/are configured to determine the load based on at least one of:
  a number of physical resource blocks used for the D2D communication,
  a number of sub-frames occupied by the D2D communication,
  a number of devices involved in the D2D communication,
  statistics concerning decoding of D2D physical channels of the D2D communication,
  received power per packet of the D2D communication,
  a delay of D2D discovery,
  a delay of D2D transmissions in the D2D communication, and
  a percentage of neighboring devices, being neighbors to at least one of the first device 111 and the second device 112, which neighboring devices are capable of successfully receiving one D2D packet within one transmission period.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system. In particular, in some examples of the method herein, the network node refers to the first or second device 111, 112.

As used herein, the term "unit" may refer to one or more functional units, each of which may be implemented as one or more hardware modules and/or one or more software modules in a node.

As used herein, the term "program carrier" may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and encode the transmission.

In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item.

If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method for managing a Hybrid Automatic Repeat reQuest (HARQ) parameter indicating a number of autonomous HARQ transmission attempts to be applied for a transmission on at least one Device-To-Device (D2D) link between a first device and a second device, the method comprising:
    determining a load relating to D2D communication between at least the first and second devices, said load being indicative of a use of resources for D2D communications; and
    determining the HARQ parameter based on the load.

2. The method of claim 1, further comprising sending, to at least one of the first device and the second device, the HARQ parameter.

3. The method of claim 2, wherein the method is performed by a network node.

4. The method of claim 1, wherein the method is performed by the first device and/or the second device.

5. The method of claim 1, wherein the determining the HARQ parameter comprises determining the HARQ parameter as a step function of load, wherein the step function steps down for at least one specific increase of the load.

6. The method of claim 1, wherein the determining the load is based on at least one of:
    a number of physical resource blocks used for the D2D communication;
    a number of sub-frames occupied by the D2D communication;
    a number of devices involved in the D2D communication;
    statistics concerning decoding of D2D physical channels of the D2D communication;
    a received power per packet of the D2D communication;
    a delay of D2D discovery;
    a delay of D2D transmissions in the D2D communication, and
    a percentage of neighboring devices, being neighbors to at least one of the first device and the second device, which neighboring devices are capable of successfully receiving one D2D packet within one transmission period.

7. A network node configured to manage a Hybrid Automatic Repeat reQuest (HARQ) parameter indicating a number of autonomous HARQ transmission attempts to be applied for a transmission on at least one Device-To-Device (D2D) link between a first device and a second device, the network node comprising:
    a processing circuit configured to cause the network node to:
        determine a load relating to D2D communication between at least the first and second devices, said load being indicative to a use of resources for D2D communications;
        determine the HARQ parameter based on the load; and
        send the determined HARQ parameter to at least the first device.

8. The network node of claim 7, wherein the processing circuit is configured to cause the network node to determine the HARQ parameter by determining the HARQ parameter as a step function of load, wherein the step function steps down for at least one specific increase of the load.

9. The network node of claim 7, wherein the processing circuit is configured to cause the network node to determine the load based on at least one of:
    a number of physical resource blocks used for the D2D communication;
    a number of sub-frames occupied by the D2D communication;
    a number of devices involved in the D2D communication;
    statistics concerning decoding of D2D physical channels of the D2D communication;
    a received power per packet of the D2D communication;
    a delay of D2D discovery;
    a delay of D2D transmissions in the D2D communication, and
    a percentage of devices, being neighbors to at least one of the first device and the second device, which devices are capable of successfully receiving one D2D packet within one transmission period.

10. A first device configured for managing a Hybrid Automatic Repeat reQuest (HARQ) parameter indicating a number of autonomous HARQ transmission attempts to be applied for a transmission on at least one Device-To-Device (D2D) link between the first device and a second device, the first device comprising:
    a processing circuit configured to cause the first device to:
        determine a load relating to D2D communication between at least the first and second devices, said load being indicative of a use of resources for D2D communications; and
        determine the HARQ parameter based on the load.

11. The first device of claim 10, wherein the processing circuit is configured to cause the first device to send the determined HARQ parameter to the second device.

12. The first device of claim 10, wherein the processing circuit is configured to cause the first device to determine the HARQ parameter by determining the HARQ parameter as a step function of load, wherein the step function steps down for at least one specific increase of the load.

13. The first device of claim 10, wherein the processing circuit is configured to cause the first device to determine the load based on at least one of:
- a number of physical resource blocks used for the D2D communication;
- a number of sub-frames occupied by the D2D communication;
- a number of devices involved in the D2D communication;
- statistics concerning decoding of D2D physical channels of the D2D communication;
- a received power per packet of the D2D communication;
- a delay of D2D discovery;
- a delay of D2D transmissions in the D2D communication, and
- a percentage of neighboring devices, being neighbors to at least one of the first device and the second device, which neighboring devices are capable of successfully receiving one D2D packet within one transmission period.

14. A computer program product stored in a non-transitory computer readable medium for managing a Hybrid Automatic Repeat reQuest (HARQ) parameter indicating a number of autonomous HARQ transmission attempts to be applied for a transmission on at least one Device-To-Device (D2D) link between a first device and a second device, the computer program product comprising software instructions which, when run on a processing circuit of a network node or the first device, causes the corresponding network node or first device to:
- determine a load relating to D2D communication between at least the first and second devices, said load being indicative of a use of resources for D2D communications; and
- determine the HARQ parameter based on the load.

15. The computer program product of claim 14:
- wherein the processing circuit is a portion of the network node; and
- wherein the software instructions, when run on the processing circuit of the network node, cause the network node send the determined HARQ parameter to the first device.

16. The computer program product of claim 14:
- wherein the processing circuit is a portion of the first device; and
- wherein the software instructions, when run on the processing circuit of the first device, cause the first device to send the determined HARQ parameter to the second device.

* * * * *